United States Patent
Kawai et al.

(10) Patent No.: US 9,085,124 B2
(45) Date of Patent: Jul. 21, 2015

(54) HEAT-SEALABLE LAYERED POLYPROPYLENE RESIN FILM AND PACKAGE

(75) Inventors: Kenji Kawai, Aichi (JP); Hirokazu Oogi, Aichi (JP); Naonobu Oda, Inuyama (JP); Tadashi Nakaya, Inuyama (JP); Tooru Imai, Aichi (JP); Yuka Sako, Aichi (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 1485 days.

(21) Appl. No.: 10/594,057

(22) PCT Filed: Feb. 18, 2005

(86) PCT No.: PCT/JP2005/002546
§ 371 (c)(1),
(2), (4) Date: Jun. 25, 2007

(87) PCT Pub. No.: WO2005/092612
PCT Pub. Date: Oct. 6, 2005

(65) Prior Publication Data
US 2007/0292640 A1    Dec. 20, 2007

(30) Foreign Application Priority Data
Mar. 26, 2004  (JP) .................. 2004-092306

(51) Int. Cl.
*B32B 5/16* (2006.01)
*B32B 27/00* (2006.01)
(Continued)

(52) U.S. Cl.
CPC ............ *B32B 27/32* (2013.01); *B32B 27/08* (2013.01); *B32B 2250/03* (2013.01);
(Continued)

(58) Field of Classification Search
CPC ..... C08L 23/10; C08L 2205/02; B32B 27/32; B32B 2307/31; B32B 2439/70; B32B 2553/00; B32B 27/08; B32B 2250/242; B32B 2439/80; B32B 2250/03; B29C 47/145; B29K 2023/12; Y10T 428/2495; Y10T 428/1334
USPC ................. 428/35.2, 35.7, 213, 147
See application file for complete search history.

(56) References Cited

U.S. PATENT DOCUMENTS 3,202,528 A * 8/1965 Gordon .................. 428/347
4,384,024 A * 5/1983 Mitchell et al. ........... 428/349
(Continued)

FOREIGN PATENT DOCUMENTS

EP    0 554 450    8/1993
JP    05-229080    9/1993
(Continued)

OTHER PUBLICATIONS

Food Packaging Technology, ed. Coles et al., CRC Press, 2003.*
(Continued)

*Primary Examiner* — Gwendolyn Blackwell
*Assistant Examiner* — Kevin Ortman, Jr.
(74) *Attorney, Agent, or Firm* — Morrison & Foerster LLP

(57) ABSTRACT

A heat sealable polypropylene resin laminate film having good toughness and heat sealing strength and energy sufficient for packaging heavy goods, mainly fruits and vegetables, and a package made of such film, is a laminate film having three or more layers, a substrate layer made of a crystalline polypropylene resin, a heat sealable layer having a melting point of not more than 150° C., and an intermediate layer. The product of the tensile modulus of elasticity (GPa) in both orthogonal directions of the film is 3.1-6.0 $(GPa)^2$, and the heat sealing energy is not less than 11N·cm/15 mm when the film is sealed, such that the heat sealing strength of the film is not less than 8N/15 mm.

9 Claims, 1 Drawing Sheet

(51) Int. Cl.
*B32B 27/08* (2006.01)
*B32B 27/32* (2006.01)

(52) U.S. Cl.
CPC ...... *B32B 2250/242* (2013.01); *B32B 2307/31* (2013.01); *B32B 2439/70* (2013.01); *B32B 2439/80* (2013.01); *B32B 2553/00* (2013.01); *Y10T 428/1334* (2015.01); *Y10T 428/2495* (2015.01)

(56) References Cited

U.S. PATENT DOCUMENTS

| | | | |
|---|---|---|---|
| 4,726,999 A * | 2/1988 | Kohyama et al. | 428/516 |
| 4,822,840 A * | 4/1989 | Kioka et al. | 525/240 |
| 5,049,436 A * | 9/1991 | Morgan et al. | 428/213 |
| 5,376,437 A * | 12/1994 | Kawakami et al. | 428/216 |
| 5,888,648 A | 3/1999 | Donovan et al. | |
| 6,001,293 A * | 12/1999 | Wakamatsu et al. | 264/173.14 |
| 6,326,068 B1 * | 12/2001 | Kong et al. | 428/35.2 |
| 6,326,080 B1 | 12/2001 | Okayama et al. | |
| 6,458,470 B1 * | 10/2002 | DeLisio et al. | 428/516 |
| 2002/0164470 A1 * | 11/2002 | Bader | 428/216 |
| 2008/0003386 A1 | 1/2008 | Kawai et al. | |
| 2009/0068487 A1 | 3/2009 | Kawai et al. | |

FOREIGN PATENT DOCUMENTS

| | | |
|---|---|---|
| JP | 07-117124 | 5/1995 |
| JP | 09-207294 | 8/1997 |
| JP | 10-76618 | 3/1998 |
| JP | 11-348205 | 12/1999 |
| JP | 2000-085073 | 3/2000 |
| JP | 2002-154188 | 5/2002 |
| JP | 2002-240210 | 8/2002 |
| JP | 2003-225979 | 8/2003 |
| JP | 2003-291282 | 10/2003 |
| JP | 2004-345135 | 12/2004 |
| JP | 2004-345136 | 12/2004 |
| JP | 2004-351749 | 12/2004 |
| JP | 2005-088522 | 4/2005 |
| WO | WO-01/34390 A1 | 5/2001 |

OTHER PUBLICATIONS

Karger-Kocsis, J. (1999). Polypropylene—An A-Z Reference.. Springer - Verlag.*
Maier, C. Calafut, T. (1998). Polypropylene—The Definitive User's Guide and Databook. William Andrew Publishing/Plastics Design Library. p. 3-25.*
European Search Report mailed Mar. 11, 2009, directed towards a related foreign application No. EP 06732094.5; 3 pages.
International Search Report mailed Jul. 25, 2006, directed to International Application No. PCT/JP2006/308187; 2 pages.
Kawai et al., U.S. Office Action mailed Oct. 15, 2009, directed to U.S. Appl. No. 10/593,237; 5 pages.
Kawai et al., U.S. Office Action mailed May 12, 2009, directed to U.S. Appl. No. 11/912,978; 7 pages.
Kawai et al., U.S. Office Action mailed Oct. 28, 2009, directed to U.S. Appl. No. 11/912,978; 10 pages.
Kawai, K et al. U.S Office Action mailed on Mar. 16, 2010 directed at U.S. Appl. No. 10/593,237; 7 pages.
Kawai, K. et al., U.S. Office Action mailed Jun. 2, 2010, directed to U.S. Appl. No. 11/912,978; 9 pages.
Kawai et al., U.S. Office Action mailed Sep. 28, 2010, directed to U.S. Appl. No. 11/912,978; 9 pages.
Kawai, K. et al., U.S. Office Action mailed Feb. 10, 2011, directed to U.S. Appl. No. 11/912,978; 10 pages.

* cited by examiner

HEAT-SEALABLE LAYERED POLYPROPYLENE RESIN FILM AND PACKAGE

REFERENCE TO RELATED APPLICATIONS

This application is a national stage application under 35 USC 371 of International Application No. PCT/JP2005/002546, filed Feb. 18, 2005, which claims priority from Japanese patent application No. 2004-092306, filed Mar. 26, 2004, the disclosures of which are incorporated herein by reference.

FIELD OF THE INVENTION

The present invention relates to a heat sealable film. More particularly, the present invention relates to a film preferable for packaging heavy goods mainly including fruits and vegetables, and a package using the film.

BACKGROUND OF THE INVENTION

Generally, as a heat sealable film used for packaging, a coextruded polypropylene resin laminate film wherein a polyolefin resin having a low melting point is laminated on a polypropylene resin, and a polypropylene resin laminate film, wherein an unoriented polyethylene resin film or polypropylene resin film and an oriented polypropylene resin film are laminated, have been frequently used.

The above-mentioned coextruded polypropylene resin laminate film has a certain degree of heat sealing strength, but insufficient to stand packaging of heavy goods such as cut vegetables for commercial use. For packaging of heavy goods, therefore, a polypropylene resin laminate film, wherein an unoriented polyethylene resin film or polypropylene resin film and an oriented polypropylene resin film are laminated is used. While these laminate films have sufficient heat sealing strength, however, they require a laminate step using an organic solvent and the like, which is economically unpreferable from the aspects of influence on the global environment.

Therefore, improvement of the heat sealing strength of the above-mentioned coextruded polypropylene resin laminate film has been variously considered. For example, patent reference 1 shows an embodiment using a polypropylene resin as a substrate layer and a linear low density polyethylene resin as a heat sealable layer, and patent reference 2 proposes an embodiment wherein an adhesion layer is formed between a polypropylene resin layer and a linear low-density polyethylene resin layer. In addition, patent reference 3 has reported that sufficient heat sealing strength can be obtained by defining the MFR (melt flow rate) of the resins to be used for respective layers.

[patent reference 1] JP-A-9-207294
[patent reference 2] JP-A-10-76618
[patent reference 3] JP-A-2003-225979

SUMMARY OF THE INVENTION

However, since the film disclosed in patent reference 1 is a laminate of different materials, the adhesion strength between layers is weak, and heat sealing strength sufficient for packaging heavy goods is difficult to achieve. Even when an adhesion layer is formed as in patent reference 2, lamination of a polyethylene resin impairs film toughness, and sometimes prevents easy handling property during bag-making processing and after packing the contents. Moreover, a mere control of MFR of the resin constituting each layer of the laminate film is difficult to provide a heat sealing energy necessary for packaging heavy goods, and particularly insufficient to package root vegetables such as potato and the like.

Conventionally, packaging films are required to have, in addition to the above-mentioned properties, transparency to enhance good appearance of the contents. In recent years, problems have occurred in that, particularly when packaging fruits and vegetables, the film becomes cloudy due to the moisture from respiration of fruits and vegetables to prevent easy view of the contents, degrading the product value. However, a film having sufficient heat sealing strength and heat sealing energy along with antifog property has not existed heretofore.

The present invention has been made taking note of the above-mentioned problems, and aims at providing a heat sealable polypropylene resin laminate film having good toughness and sufficient heat sealing strength and heat sealing energy for packaging heavy goods mainly of fruits and vegetables, and a package made of such film.

The heat sealable polypropylene resin laminate film of the present invention that can solve the above-mentioned problems comprises 3 or more layers consisting of a heat sealable layer having a melting point of not more than 150° C. as a surface layer, a substrate layer made of a crystalline polypropylene resin, and an intermediate layer between the heat sealable layer and the substrate layer, wherein the product of the tensile modulus of elasticity in the machine direction (MD) of the film and in the direction (TD) transverse to the machine direction of the film is 3.1-6.0 $(GPa)^2$, and the heat sealing energy in each of the machine direction of the film and the direction transverse to the machine direction of the film is not less than 11N·cm/15 mm, when the film is sealed such that the heat sealing strength of the film is not less than 8N/15 mm.

In the present invention, the product of the tensile modulus of elasticity is an index of the toughness of a laminate film, and the heat sealing energy is an index of the resistance to the stress that acts on the sealed part of the laminate film, which is derived from the relationship between the heat sealing strength of the film up to breakage and elongation of the film during the measurement of the heat sealing strength of the film (absorption energy up to the breakage of sealed part). Here, "such that the heat sealing strength of the film is not less than 8N/15 mm" considers use of the laminate film of the present invention for packaging heavy goods, and one having such heat sealing strength is considered to have a sufficient strength capable of standing the packaging of heavy goods.

A laminate film having the above-mentioned constitution has suitable toughness, and superior heat sealing strength and heat sealing energy. Thus, it can be preferably used for packaging.

It is preferable that the thicknesses of the substrate layer and the intermediate layer satisfy the following relational formula:

$$2x < y$$

wherein x is the thickness of the above-mentioned substrate layer and y is the thickness of the intermediate layer.

In addition, the above-mentioned intermediate layer preferably contains an α-olefin copolymer containing a cold xylene-soluble fraction in a proportion of not more than 3% by mass, and the above-mentioned α-olefin copolymer is desirably contained in the intermediate layer in a proportion of 10-70% by mass.

Moreover, the above-mentioned intermediate layer preferably contains the crystalline polypropylene resin constituting the substrate layer and the resin constituting the heat sealable layer, since the adhesion strength between each layer constituting the laminate film becomes superior.

The above-mentioned the surface of the heat sealable layer preferably has a wetting tension after water washing of not less than 31 mN/m, and the surface of the aforementioned heat sealable layer before water washing preferably contains an antifog agent.

The above-mentioned laminate film is desirably biaxially oriented.

The package made of the above-mentioned laminate film can also be preferably used for packaging of heavy goods.

Since the heat sealable polypropylene resin laminate film of the present invention has high heat sealing strength and high heat sealing energy, shows good toughness and is superior in handling property of goods, it can be preferably used for packaging of heavy goods. Since it can have antifog property, it can also be preferably used as a packaging film for fruits and vegetables.

DETAILED DESCRIPTION OF THE INVENTION

Figure 1:
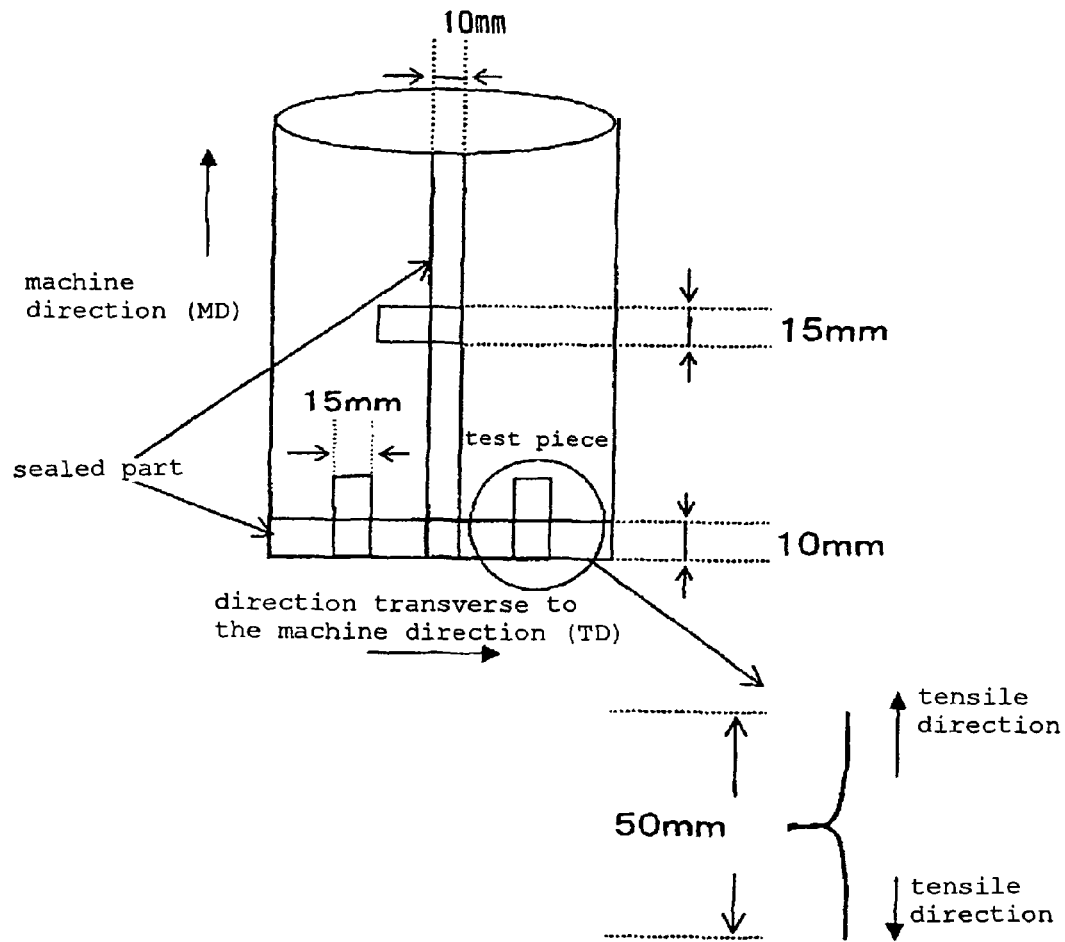
FIG. 1 is a schematic showing of the shape of the bag prepared in accordance with the invention and a test piece for heat sealing strength measurement.

The heat sealable polypropylene resin laminate film of the present invention has three or more layers, which characteristically comprise a heat sealable layer having a melting point of not more than 150° C. as a surface layer, a substrate layer made of a crystalline polypropylene resin, and an intermediate layer between the heat sealable layer and the substrate layer, wherein the product of the tensile modulus of elasticity in the machine direction (MD) of the film and in the direction (TD) transverse to the machine direction of the film is 3.1-6.0 $(GPa)^2$, and the heat sealing energy in each of the machine direction of the film and the direction transverse to the machine direction of the film is not less than 11N·cm/15 mm, when the film is sealed such that the heat sealing strength of the film is not less than 8N/15 mm.

Since the laminate film of the present invention aims at packaging of heavy goods as mentioned above, to ensure handling property during packaging goods, it is required to show a product of the tensile modulus of elasticity of the machine direction (MD) of the film and the transverse direction (TD) thereto of not less than 3.1 $(GPa)^2$ and not more than 6.0 $(GPa)^2$, as measured according to the definition of JIS-K-7127. It is preferably not less than 3.3 $(GPa)^2$, more preferably not less than 3.4 $(GPa)^2$, and preferably not more than 5.5 $(GPa)^2$, more preferably not more than 5.0 $(GPa)^2$.

In general, the tensile modulus of elasticity of the film to be used as a packaging material is known to be correlated with the toughness during handling of packaging material. In the present invention, the product of the tensile modulus of elasticity of the MD and TD is used as an evaluation criterium of the toughness of the film, rather than the tensile modulus of elasticity. This is because when, for example, the film is used as a bag package, the toughness in the both directions of the machine direction (MD) of the film and transverse direction (TD) thereto is required.

Accordingly, when the product of the tensile modulus of elasticity does not reach the above-mentioned level, the film toughness becomes low, and the handling property of the package tends to be degraded. On the other hand, when it exceeds the above-mentioned range, the film tends to become stiff, and the crack made in the film upon opening the package easily propagates, and the contents may spill upon opening the package. When the tensile modulus of elasticity is too high, the film does not stretch easily and the below-mentioned heat sealing energy may be difficult to obtain.

When the product of the tensile modulus of elasticity falls under the above-mentioned range, the tensile modulus of elasticity of MD and TD is not particularly limited. The tensile modulus of elasticity of MD is preferably not less than 1.40 GPa, more preferably 1.45 GPa, and the tensile modulus of elasticity of TD is preferably not less than 2.25 GPa, more preferably not less than 2.35 GPa.

In addition, the laminate film of the present invention needs to show the heat sealing energy in each of the machine direction of the film and the direction transverse to the machine direction of the film of not less than 11N·cm/15 mm when the film is sealed such that the heat sealing strength of the film becomes not less than 8N/15 mm. It is preferably not less than 12N·cm/15 mm, more preferably not less than 12.5N·cm/15 mm.

Here, the heat sealing energy is derived from the relationship between the heat sealing strength and the elongation of the film during measurement of the heat sealing strength, and means the film absorption energy up to the breakage (or yielding) of the sealed part.

When a laminate film is used as a bag package, the sealed part may be broken due to vibration and impact during transport, falling during distribution route and the like. This phenomenon is remarkable particularly when heavy goods are packaged. The breakage of the sealed part is greatly influenced not only by the strength (heat sealing strength) of the sealed part but also elongation of the sealed part up to the breakage. Therefore, when the sealed part is elongated, the impact during transportation or cargo handling is dispersed, which in turn prevents breakage of the sealed part, i.e., breakage of the package. Namely, a smaller heat sealing energy means difficult elongation of the sealed part. In such a case, the impact cannot be dispersed, and a topical load applies on the sealed part. As a result, when the heavy goods are packaged with such a laminate film, the package tends to get broken easily.

Note that the above-mentioned "when the MD and TD of the film are sealed, such that the heat sealing strength of the film is not less than 8N/15 mm" is based on the judgment that a heat sealing strength of not less than 8N/15 mm can afford a sufficient strength for packaging of heavy goods. This is derived from the fact that it may be difficult to afford the aforementioned heat sealing strength by specifying the heat sealing temperature according to the kind of the resin constituting each layer or thickness of the layer constituting the laminate film. In the present invention, therefore, the heat sealing strength of a package capable of standing the packaging of heavy goods has been set for not less than 8N/15 mm. Accordingly, when the heat sealing strength does not reach the above-mentioned value, the strength becomes insufficient and the bag breakage may occur during handling of the package.

The heat sealing strength and heat sealing energy in the present invention are measured by the following measurement methods.

Heat Sealing Strength:

A sample cut out in such a manner that the machine direction of the film is the length direction of a bag is heat sealed (seal width: 10 mm) to form a center press seal bag having a T-shaped sectional sealed part of the bag, as shown in FIG. 1 (central principal rafter seal shape), size 185 mm×255 mm.

The heat sealing is performed under the conditions of seal temperature 150° C., pressure 2 Kg/cm², heat sealing time 2 sec.

A test piece (width 15 mm, length 50 mm) was cut out from a sealed part parallel to each of the length direction (MD) and width direction (TD) of the obtained bag. Then, the test piece was left standing in an atmosphere of temperature 20° C., humidity 65% RH for 24 hr. Using "TENSILON" (UTM-IIIL) manufactured by Toyo Seiki Seisaku-sho, LTD., the strength by peeling at 180 degrees at a distance between chucks of 20 mm (held at 10 mm from heat sealed part) and a speed of 200 mm/min (chart speed 200 mm/min) was measured and taken as a heat sealing strength [N/15 mm]. FIG. 1 shows the shape of the bag formed and a schematic view of the test piece for the measurement of the heat sealing strength.

Figure 2:
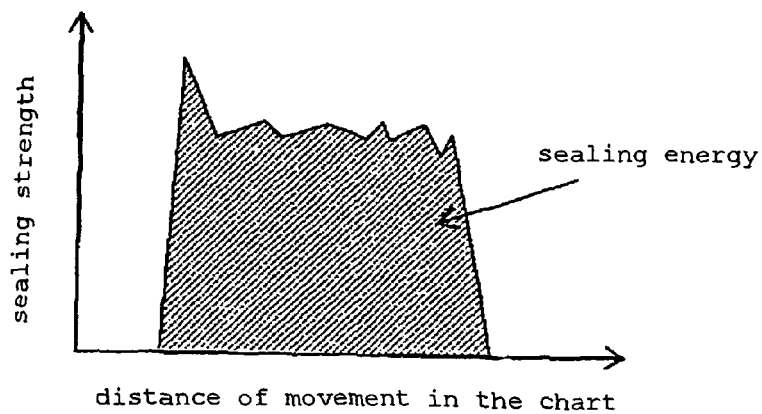
FIG. 2 is a chart of the measured heat sealing strength.

Heat Sealing Energy:

The heat sealing energy can be led from the chart obtained by the measurement of the heat sealing strength. In the present invention, the area surrounded by the curve showing the heat sealing strength and the distance of movement in the chart is taken as the heat sealing energy [N·cm/15 mm](FIG. 2).

Now, each layer constituting the laminate film of the present invention is explained.

As the crystalline polypropylene resin to be used for the substrate layer of the laminate film of the present invention, n-heptane insoluble isotactic polypropylene used for general extrusion forming purposes is preferably employed. The n-heptane insolubility is an index of crystallinity of polypropylene and simultaneously indicates the safety when applied to food packaging. In the present invention, one meeting the n-heptane insolubility (elution of not more than 150 ppm by extraction at 25° C. for 60 min [not more than 30 ppm when temperature in use exceeded 100° C.]) according to the Notice No. 20, February 1982, by the Ministry of Health and Welfare is a preferable embodiment.

The isotactic polypropylene may be homopolypropylene (propylene homopolymer) or a random copolymer or block copolymer of polypropylene and other α-olefin. When a copolymer with other α-olefin is to be employed, a polypropylene containing propylene in a proportion of not less than 70% by mass is preferably used, and other α-olefin as the above-mentioned copolymerizable component is preferably an α-olefin having a carbon number of 2 to 8, such as ethylene, butene-1, hexene-1, 4-methyl-1-pentene and the like. The substrate layer may contain the aforementioned crystalline polypropylene resin alone, or may be a mixture of two or more kinds thereof.

The polypropylene resin to be used for the above-mentioned substrate layer preferably has a melt flow rate (MFR) of not less than 0.1 g/10 min, more preferably not less than 0.5 g/10 min, further preferably not less than 1.0 g/10 min, and preferably not more than 100 g/10 min, more preferably not more than 20 g/10 min, and further preferably not more than 15 g/10 min. When the MFR does not satisfy the above-mentioned range, the resin may have poor flowability and production of the film sometimes becomes difficult. When it exceeds the above-mentioned range, the film strength becomes small and inconveniences in handling easily occur.

The laminate film of the present invention has a heat sealable layer having a melting point of not more than 150° C. as a surface layer thereof. The resin constituting the heat sealable layer is a thermoplastic resin having a melting point of not more than 150° C., which is preferably a random copolymer or block copolymer obtained by polymerization of two or more kinds selected from α-olefin monomers having a carbon number of 2 to 10. As the α-olefin monomers having a carbon number of 2 to 10, ethylene, propylene, butene, pentene, hexene, octene, decene and the like can be mentioned. As the resin constituting the heat sealable layer, the above-mentioned copolymer alone, or a mixture of two or more kinds thereof can be used.

Particularly, the resin constituting the heat sealable layer preferably contains a propylene-butene copolymer having a high butene content. Here, the butene content of the above-mentioned propylene-butene copolymer is preferably not less than 20% by mass. While the upper limit of the butene content is not particularly limited, it can be appropriately determined within the range free of defects, since too much butene content produces a sticky film surface and may degrade slip property and resistance to blocking. As the above-mentioned propylene-butene copolymer having a high butene content, for example, "SPX78J1" manufactured by Sumitomo Chemical Co., Ltd. and the like can be mentioned.

The above-mentioned propylene-butene copolymer is preferably contained in a proportion of not less than 65% by mass of the resin component constituting the heat sealable layer. It is more preferably not less than 70% by mass and not more than 99% by mass, and more preferably not more than 95% by mass. When the above-mentioned propylene-butene copolymer content is too small, the melt adhesion during sealing is degraded and a sufficient heat sealing energy may not be easily obtained. When it is too high, the interlayer strength with the intermediate layer may be degraded.

To impart a sufficient heat sealing strength to the laminate film of the present invention, the lower limit of the melting point of the resin component constituting the above-mentioned heat sealable layer is preferably 60° C. When the lower limit of the melting point is too low, the heat sealed part may have poor heat resistance. When the melting point is too high, improvement of the heat sealing strength cannot be expected. Accordingly, the upper limit of the melting point was set to 150° C.

To ensure workability and strength during film production, moreover, the resin constituting the heat sealable layer preferably has an MFR of 0.1-100 g/10 min, more preferably 0.5-20 g/10 min, further preferably 1.0-15 g/10 min.

The laminate film of the present invention has an intermediate layer between the aforementioned substrate layer and the heat sealable layer. The intermediate layer improves the interlayer strength of the above-mentioned substrate layer and the heat sealable layer, and also ensures that the laminate film of the present invention has appropriate toughness and heat sealing energy.

The resin constituting the above-mentioned intermediate layer preferably contains at least one kind of an α-olefin copolymer having a cold xylene-soluble fraction (CXS) content of not more than 3% by mass.

The above-mentioned "cold xylene-soluble fraction" means the amount of the amorphous part in the α-olefin copolymer and the "cold xylene-soluble fraction of not more than 3% by mass" means an α-olefin copolymer having a small amorphous part and high crystallinity.

The α-olefin copolymer is superior in the mechanical strength such as impact strength, tear property and the like, low temperature property, weather resistance and the like. Addition of this component affords superior properties of the laminate film. However, since α-olefin copolymer has a structure wherein heterologous α-olefin, as a second or third component, is randomly introduced into the main component of α-olefin molecular chain, crystallization is suppressed, and the crystallinity becomes low as compared to α-olefin homopolymers such as homopolypropylene and the like, wherein the addition of the α-olefin copolymer results in decreased toughness of the film. On the other hand, when the amorphous part is too small, the film becomes stiff and is not easily elongated, and therefore, sufficient heat sealing energy cannot be easily achieved. From these aspects, with the aim of affording a laminate film having appropriate toughness and capable of elongation depending on the load, an α-olefin copolymer having a cold xylene-soluble fraction content of not more than 3% by mass is added to the intermediate layer.

The amount of addition of the above-mentioned α-olefin copolymer having a cold xylene-soluble fraction content of not more than 3% by mass to the intermediate layer is preferably not less than 10% by mass, more preferably not less than 15% by mass, preferably not more than 70% by mass, and more preferably, not more than 60% by mass. When the content of the above-mentioned α-olefin copolymer is too small, the adhesion between respective layers constituting the laminate film may become insufficient and sufficient heat sealing strength may not be obtained. When it is too high, the toughness of the whole film may be degraded. When the content of the α-olefin copolymer is within the above-mentioned range, the intermediate layer can also be deformed somewhat along with the heat sealable layer during heat sealing at a high temperature. Thus, the seal layer is deformed (thinning) to suppress decrease in the heat sealing energy.

As the above-mentioned α-olefin having a cold xylene-soluble fraction content of not more than 3% by mass, polymers synthesized by the continuous gas phase polymerization described in JP-A-2003-277412 can be mentioned and, for example, "FSX66E8" (manufactured by Sumitomo Chemical Co., Ltd.) can be used.

The above-mentioned cold xylene-soluble fraction is a value calculated from the mass of the precipitate obtained by completely dissolving a sample (1 g) in boiling xylene (100 ml), cooling the solution to 20° C., standing the solution for 4 hr, filtering off the precipitate, evaporating the solvent from the filtrate, and drying the residue under reduced pressure at 70° C.

The intermediate layer of the laminate film of the present invention preferably contains, in addition to the aforementioned α-olefin copolymer, at least one kind of a resin constituting each of the substrate layer and the heat sealable layer. By adding these resins, the affinity between substrate layer-intermediate layer, and intermediate layer-heat sealable layer increases, and the adhesion between laminate film layers can be enhanced. The content of each of these resins is preferably not less than 6% by mass, more preferably not less than 10% by mass, and preferably not more than 69% by mass, more preferably not more than 65% by mass, of the resin component constituting the intermediate layer. When the content is small, interlayer adhesion tends to become insufficient. When the content of the resin constituting the substrate layer is high, the heat sealing energy may become insufficient, and when the content of the resin constituting the heat sealable layer is too high, the intermediate layer becomes softened and the toughness may be impaired.

Moreover, the above-mentioned substrate layer, intermediate layer and heat sealable layer may contain an antifog agent. As mentioned above, particularly the film used for packaging fruits and vegetables has been required to have antifog property in recent years. The antifog property also provides, in addition to the appearance characteristic permitting a clear view of the contents, a suppressive effect on water spot of the contents caused by the waterdrops produced by the physiological action of fruits and vegetables. Moreover, since the addition of an antifog agent improves slip property of the film, the production step of the film and packaging step using the film can be performed smoothly.

As the antifog agent usable for the laminate film of the present invention, for example, fatty acid esters of polyvalent alcohol such as glycerol fatty acid esters (e.g., glycerol monooleate, glycerol laurate, glycerol caprate, diglycerol oleate, diglycerol laurate, triglycerol oleate and the like), sorbitan fatty acid esters (e.g., sorbitan laurate and the like), polyethylene glycol fatty acid esters (e.g., polyethylene glycol oleate, polyethylene glycol laurate and the like), and the like, amines of higher fatty acid, amides of higher fatty acid such as stearic acid amide., oleamide, erucic acid amide and the like, amine of higher fatty acid, ethylene oxide adduct of amide and the like can be mentioned.

While the antifog agent may be used by mixing with the resin constituting each layer constituting the laminate film during film production, it may be added to a particular layer alone. Even when the agent is added to a particular layer alone, the antifog agent sequentially migrates (bleeds out) to other layers during film production and preservation after film production, and finally reaches the surface of a heat sealable layer, thereby imparting the antifog property to the surface of the heat sealable layer.

For smooth bleeding out of the antifog agent as mentioned above, the concentration of the antifog agent in each layer constituting the laminate film preferably has a gradient. To be specific, the antifog agent is preferably added at concentrations gradually decreasing from the substrate layer to the heat sealable layer.

The content of the above-mentioned antifog agent can be determined in consideration of temperature changes during preservation or distribution, and the antifog agent in an amount capable of continuously showing antifog property during repeated temperature changes between 50° C. and 30° C. is desirably present on the surface of the heat sealable layer. From such viewpoint, the content of the antifog agent is preferably not less than 0.1% by mass, more preferably not less than 0.2% by mass, and preferably not more than 10% by mass, more preferably not more than 5% by mass, based on the whole layer constituting the laminate film. To ensure heat sealability, the content of the antifog agent in the components constitution the heat sealable layer is preferably not more than 5% by mass, more preferably not more than 1.0% by mass, and preferably not less than 0.01% by mass.

For the aforementioned effect of the antifog agent to be sufficiently exhibited, the wetting tension after water washing the surface of the heat sealable layer constituting the laminate film of the present invention is preferably not less than 31 mN/m and not more than 41 mN/m. The wetting tension of the surface of the heat sealable layer after water washing was used as an index of the antifog property evaluation here, because the surface of the heat sealable layer before washing naturally contains an antifog agent bled out from the inside of the laminate film, and the wetting tension measured in this state includes contribution of the antifog agent along with the property of the heat sealable layer itself.

When the wetting tension after washing the surface is low, the diffusion effect of the antifog agent in the surface of the heat sealable layer tends to be insufficient, and when the wetting tension is too high, the heat sealability of the heat sealable layer tends to decrease.

Each layer constituting the laminate film of the present invention may contain various additives and fillers as necessary, as long as the property of each layer is not impaired. For example, heat stabilizer, antioxidant, light stabilizer, antistatic agent, lubricant, nucleating agent, flame-retardant, pigment, colorant, calcium carbonate, barium sulfate, magnesium hydroxide, mica, talc, clay, zinc oxide, magnesium oxide, aluminum oxide, antimicrobial agent, biodegradable additive and the like can be mentioned. Moreover, thermoplastic resin, thermoplastic elastomer, rubbers, hydrocarbon resin, petroleum resin and the like other than those mentioned above can also be added, as long as the property of the laminate film is not impaired.

The laminate film of the present invention is preferably one, wherein the thicknesses of the substrate layer and the intermediate layer satisfy the following relational formula:

$$2x<y$$

wherein x is the thickness of the above-mentioned substrate layer and y is the thickness of the intermediate layer.

This is because a laminate film having the aforementioned constitution, wherein the thicknesses of the substrate layer and the intermediate layer satisfy the above-mentioned relational formula easily affords heat sealing energy and toughness of the laminate film.

The laminate film of the present invention is not particularly limited as long as the thicknesses of the substrate layer and the intermediate layer satisfy the above-mentioned relationship, and the substrate layer preferably not less than 10% and not more than 32% (more preferably not less than 15% and not more than 30%) of the thickness of the whole layer of the laminate film, the heat sealable layer is not less than 1% and not more than 20% (more preferably not less than 1.5% and not more than 15%) thereof, and the intermediate layer is not less than 30% and not more than 89% (more preferably not less than 40% and not more than 83.5%) thereof. When the thickness of the substrate layer is less than 10%, the heat sealable layer exceeds 20% and the intermediate layer exceeds 89%, the toughness of the laminate film tends to be difficult to achieve, which is unpreferable for the handling of products. When the thickness of the substrate layer exceeds 50%, the heat sealable layer is less than 1%, and the intermediate layer is less than 40%, the object heat sealing strength and heat sealing energy may not be easily achieved.

The constitution of the laminate film of the present invention is not particularly limited as long as the above-mentioned substrate layer, intermediate layer and heat sealable layer are included, and the present invention encompasses an embodiment wherein a polypropylene resin layer of the same kind as the resin constituting the substrate layer or other resin layer (e.g., saponified product of ethylene-vinyl acetate copolymer, gas barrier resin layer of polyvinyl alcohol and the like and the like) for imparting various properties to the laminate film is laminated on the surface of the above-mentioned substrate layer. Moreover, as long as the characteristics of the laminate film are not impaired, the position of lamination of the above-mentioned other resin layer is not limited and, for example, the aforementioned other layer can also be formed between the substrate layer and the intermediate layer, and between the intermediate layer and the heat sealable layer.

The production method of the laminate film of the present invention is not particularly limited, and can be freely produced by a conventionally known method. For example, after melt lamination using an extruder suitable for the number of lamination by a T die method, an inflation method and the like, an unoriented laminate film is produced by cooling by a cool roll method, a water cooling method, or an air cooling method, and stretched by a sequential biaxial orientation, a simultaneous biaxial orientation, a tubular orientation process and the like.

The laminate film of the present invention may be applied as necessary (e.g., improvement of printability and the like) to a surface treatment as long as the characteristics of the film are not inhibited. As a method of surface treatment, a corona discharge treatment, a plasma treatment, a flame treatment, an acid treatment and the like can be mentioned. Of the above-mentioned methods, the corona discharge treatment, the plasma treatment and the flame treatment are preferable because continuous treatment can be conducted and the treatment can be easily applied before take-up during film production. Particularly, as a means to improve wetting tension of the surface of the heat sealable layer, a corona discharge treatment is recommended. Depending on the use, the film may be subjected to a special processing such as perforation processing and the like. For example, 1-500 μm perforated film can be used as a freshness maintenance package for fruits and vegetables.

The heat sealable polypropylene resin laminate film of the present invention has sufficient heat sealing strength for packaging heavy goods, is superior in handling property and shows good transparency. Thus, the film is preferable as a packaging material for cereals such as wheat, rice, wheat and the like; root vegetables such as potato, radish-carrot and the like; plate or string konjac, pickled radish; various pickles such as vegetables pickled in soy sauce or sake lees and the like; various bean pastes; jacket materials (e.g., concentrated soup, soup for Japanese noodle, soy sauce, sauce, ketchup, mayonnaise and the like); and collective package for packing several packages of Chinese noodle and the like. Particularly, the film can be used as a packaging material most suitable for packaging cut vegetables for commercial use and the like, that require antifog property. In addition, the laminate film of the present invention can be used not only as food packages but also for packaging clothing such as underwear, clothing and the like, shopping, packaging pharmaceutical products, cosmetics and the like.

Moreover, the laminate film of the present invention can also be used as a package of paper carton, tube, bag, cup, standing pack, tray and the like.

EXAMPLES

The present invention is explained in more detail in the following by referring to Examples, which are not to be construed as limitative as long as they do not depart from the gist of the present invention. The properties in the present specification were evaluated by the following methods.

[Heat Sealing Strength]

A sample cut out from the packaging film obtained in the following Experimental Example in such a manner that the machine direction of the film is the length direction of a bag was heat sealed (seal width: 10 mm) to form a center press seal bag having a T-shaped sectional sealed part of the bag, as shown in FIG. 1 (central principal rafter seal shape), 185 mm×255 mm. The heat sealing was performed under the conditions of seal temperature 150° C., pressure 196 kPa (2 Kg/cm$^2$), heat sealing time 2 sec using a sealer "Test Sealer" manufactured by NISHIBE KIKAI CO., LTD.

A test piece (width 15 mm, length 50 mm) was cut out from a sealed part parallel to each of the length direction (MD) and width direction (TD) of the bag. Then, the test piece was left standing in an atmosphere of temperature 20° C., humidity 65% RH for 24 hr. Using "TENSILON" (UTM-IIIL) manufactured by Toyo Seiki Seisaku-sho, LTD., the strength by peeling at 180 degrees at a distance between chucks of 20 mm (held at 10 mm from heat sealed part) and a speed of 200 mm/min (chart speed 200 mm/min) was measured and taken as a heat sealing strength (N/15 mm). FIG. 1 shows the shape of the bag formed and a schematic view of the test piece for the measurement of the heat sealing strength.

[Heat Sealing Energy]

In the chart obtained by the above-mentioned heat sealing strength measurement, the area surrounded by the heat sealing strength and the distance of movement in the chart was measured and taken as the heat sealing energy (N·cm/15 mm). FIG. 2 shows an xample of the chart.

[Tensile Modulus of Elasticity]

According to JIS-K-7127, tensile modulus of elasticity (GPa) in the film machine direction (MD) and the film machine transverse direction (TD) was measured. The measurement was conducted 3 times for each direction, and the average value thereof was taken as the tensile modulus of elasticity of each direction.

[Product Handling Performance]

About 400 g of potatoes were placed in a bag prepared in the same manner as in the above-mentioned heat sealing strength measurement, the bag was bound, and pack-sealed at 2 cm from the bag seam with a tape having a width of about 1 cm. Then the potato bag-packing workability and product handling performance after bag-packing were evaluated according to the following evaluation criteria.

Evaluation Criteria evaluation grade 5: Film is tough, and bag packing, box packing, unboxing and display work can be easily done.

evaluation grade 4: Bag is somewhat weak, but the work can be done without problems.

evaluation grade 3: Bag lacks toughness, is felt weak in hands and the work is somewhat difficult to perform.

evaluation grade 2: Bag lacks toughness, is felt weak in hands and the work is difficult to perform.

evaluation grade 1: Bag completely lacks toughness and the work is difficult to perform.

[Resistance to Breakage of Bag during Product Handling]

The bag containing potatoes, which was prepared for the product handling performance test was dropped from a height of 120 cm and breakage of bag and the number of drops up to the bag breakage were confirmed.

[Antifog Property]

The antifog property of the film obtained in the following Production Example was evaluated according to the following steps.

1. Warm water (300 cc) at 50° C. is placed in a 500 cc container having an upper opening (opening area 78.5 cm$^2$).
2. The film container opening is sealed with the heat sealable layer (antifog property measurement surface) of the film facing inside.
3. The bag is left standing in a cold room at 50° C. for 12 hr.
4. After leaving the bag in the cold room at 50° C., the bag is moved to the environment at 30° C. and left standing for 12 hr.
5. The operations of 3. and 4. are repeated for 2 days, and the dew attachment to the surface of the heat sealable layer of the film is evaluated according to the following evaluation criteria.

Evaluation Criteria evaluation grade 6: No dew on the entire surface (attached area 0)

evaluation grade 5: small dew attachment (attached area up to ⅕)

evaluation grade 4: a little dew attachment (attached area up to ¼)

evaluation grade 3: dew attachment of about ½ (attached area up to ⅔)

evaluation grade 2: nearly entire dew attachment (attached area up to ¾)

evaluation grade 1: entire dew attachment (attached area ¾ or above)

[Wetting Tension]

The surface of the heat sealable layer of the film obtained in the following Production Example was washed with distilled water for 40-50 sec and the wetting tension of the film was evaluated according to JIS-K-6768.

The resins constituting each layer used in the following Production Example were as follows.

propylene homopolymer: "FS2011DG3" manufactured by Sumitomo Chemical Co., Ltd., MFR: 2.5 g/10 min, melting point: 158° C., cold xylene-soluble fraction (CXS): 3.3% by mass propylene•ethylene•butene random copolymer-1: "FSX66E8" manufactured by Sumitomo Chemical Co., Ltd., ethylene content: 2.5 mol %, butene content: 7 mol %, MFR: 3.1 g/10 min, melting point: 133° C., cold xylene-soluble fraction (CXS): 1.6% by mass propylene•ethylene•butene random copolymer-2: "W171" manufactured by Sumitomo Chemical Co., Ltd., ethylene content: 4.6 mol %, butene content: 4.2 mol %, MFR: 4.6 g/10 min, melting point: 128° C., cold xylene-soluble fraction (CXS): 4.6% by mass propylene•ethylene•butene random copolymer-3: "WF584S" manufactured by Sumitomo Chemical Co., Ltd., ethylene content: 2.6 mol %, butene content: 5.4 mol %, MFR: 4.0 g/10 min, melting point: 135° C., cold xylene-soluble fraction (CXS): 3.6% by mass (Produced by Solution Polymerization)

propylene•butene copolymer-1: "SPX78J1" manufactured by Sumitomo Chemical Co., Ltd., butene content: 25 mol %, MFR:8.5 g/10 min, melting point: 128° C., cold xylene-soluble fraction (CXS): 14.0% by mass propylene•butene copolymer-2: "SP8932" manufactured by Sumitomo Chemical Co., Ltd., butene content: 33 mol %, MFR: 9.0 g/10 min, melting point: 130° C.

Production Example 1

Using three melt extruders, substrate layer A (propylene homopolymer) was melt-extruded from the first extruder, heat sealable layer C (resin mixture of propylene•ethylene•butene random copolymer-1: 10 parts by mass, propylene•butene copolymer-1: 90 parts by mass) was melt-extruded from the second extruder, and intermediate layer B (resin mixture of propylene•ethylene•butene random copolymer-1: 40% by mass, propylene homopolymer: 60% by mass) was melt-extruded from the third extruder, each at a resin temperature of 260° C., and laminated in a T die to form substrate layer A/intermediate layer B/heat sealable layer C, which was cool-solidified on a chill roll at 20° C. Then, the obtained unoriented film was stretched 4.5-fold in the longitudinal direction, and 8-fold in the transverse direction to give a packaging laminate film 1 (40 μm) having substrate layer A: 10 μm, intermediate layer B: 28 μm, and heat sealable layer C: 2 μm. The constitution and evaluation results of laminate film 1 are shown in Table 1.

The obtained laminate film 1 was sufficient in heat sealing strength, heat sealing energy and toughness, and superior in all of the handling property and resistance to breakage of bag after packing heavy goods.

Production Example 2

Using three melt extruders, substrate layer A (resin mixture of propylene homopolymer: 100 parts by mass, polyoxyethylene(2)stearylaminemonostearic acid ester: 0.8 part by mass, polyoxyethylene(2)stearylamine: 0.2 part by mass, stearic acid monoglycerolester: 0.2 part by mass) was melt-extruded from the first extruder, heat sealable layer C (resin mixture of propylene•ethylene•butene copolymer-1: 10 parts by mass and propylene•butene copolymer-1: 90 parts by mass) was melt-extruded from the second extruder, and intermediate layer B (resin mixture of a resin mixture of propylene•ethylene•butene random copolymer-1: 40% by mass and propylene homopolymer: 60% by mass, and polyoxyethylene(2)stearylaminemonostearic acid ester: 0.3 part by weight, polyoxyethylene(2)stearylamine: 0.1 part by weight and stearic acid monoglycerolester: 0.24 part by weight) was melt-extruded from the third extruder, each at a resin temperature of 260° C., and laminated in a T die to form substrate layer A/intermediate layer B/heat sealable layer C, which was cool-solidified on a chill roll at 20° C. Then, the obtained unoriented film was stretched 4.5-fold in the longitudinal direction, and 8-fold in the transverse direction to give a three-layer packaging laminate film 2 (40 μm) having substrate layer A: 10 μm, intermediate layer B: 28 μm, and heat sealable layer C: 2 μm.

The surface of the heat sealable layer C of the obtained laminate film 2 was subjected to a corona discharge treatment such that the wetting tension of the surface (after water washing) of the heat sealable layer C after corona discharge treatment became 36 mN/m. The constitution and evaluation results of the laminate film are shown in Table 1.

The obtained laminate film 2 had heat sealing strength, heat sealing energy, toughness, as well as antifog property, and was sufficient in all of the handling property, resistance to breakage of bag after packing heavy goods, appearance of commercial product and the like.

Production Example 3

In the same manner as in Production Example 2 except that the level of corona treatment was adjusted to achieve the wetting tension (after water washing) of the surface of the heat sealable layer C as shown in Table 1, laminate films 3 and 4 were obtained. The constitution and evaluation results of the laminate films are shown in Table 1.

The laminate films 3 and 4 were superior in heat sealing strength, heat sealing energy and toughness. Since the corona discharge treatment of the laminate film 4 was insufficient, the antifog property was somewhat low.

Production Example 4

In the same manner as in Production Example 1 except that the mixing ratio of the resins constituting each layer of the laminate film was changed as shown in Table 1, laminate film 5 was produced.

The obtained laminate film 5 was superior in heat sealing strength, heat sealing energy and toughness.

TABLE 1

| laminate film | | 1 | | 2 | | 3 | | 4 | | 5 | |
|---|---|---|---|---|---|---|---|---|---|---|---|
| layer A (substrate layer) | kind | PP-1 | | PP-1 | | PP-1 | | PP-1 | | PP-1 | |
| | mixing ratio | 100 | | 100 | | 100 | | 100 | | 100 | |
| layer B (intermediate layer) | kind | PP-1 | Pr-Et-Bu-1 | PP-1 | Pr-Et-Bu-1 | PP-1 | Pr-Et-Bu-1 | PP-1 | Pr-Et-Bu-1 | PP-1 | Pr-Et-Bu-1 |
| | mixing ratio | 60 | 40 | 60 | 40 | 60 | 40 | 60 | 40 | 65 | 35 |
| layer C (heat sealable layer) | kind | Pr-Et-Bu-1 | Pr-Bu-1 | Pr-Et-Bu-1 | Pr-Bu-1 | Pr-Et-Bu-1 | Pr-Bu-1 | Pr-Et-Bu-1 | Pr-Bu-1 | Pr-Et-Bu-1 | Pr-Bu-1 |
| | mixing ratio | 10 | 90 | 10 | 90 | 10 | 90 | 10 | 90 | 30 | 70 |
| thickness | layer A (μm) | 10 | | 10 | | 10 | | 10 | | 10 | |
| | layer B (μm) | 28 | | 28 | | 28 | | 28 | | 28 | |
| | layer C (μm) | 2 | | 2 | | 2 | | 2 | | 2 | |
| | total | 40 | | 40 | | 40 | | 40 | | 40 | |
| heat sealing strength (N/15 mm) | film length direction | 13.0 | | 11.8 | | 12.3 | | 13.0 | | 8.7 | |
| | film width direction | 13.3 | | 12.4 | | 13.9 | | 13.5 | | 8.5 | |
| heat sealing energy (N·cm/15 mm) | film length direction | 14.8 | | 13.4 | | 13.4 | | 14.8 | | 12.5 | |
| | film width direction | 14.2 | | 14.2 | | 15.6 | | 16.2 | | 12.9 | |
| toughness: product of tensile modulus of elasticity (GPa)$^2$ | | 3.8 | | 3.8 | | 3.8 | | 3.8 | | 4.4 | |
| wetting tension after water washing of surface of heat sealable layer | | less than 30 | | 36 | | 33 | | less than 30 | | less than 30 | |
| antifog property | | grade 1 | | grade 6 | | grade 5 | | grade 3 | | grade 1 | |

TABLE 1-continued

| laminate film | 1 | 2 | 3 | 4 | 5 |
|---|---|---|---|---|---|
| Product handling property | 5 | 5 | 5 | 5 | 5 |
| resistance to breakage of bag (number of drops up to bag breakage) during product handling | not less than 5 | 5 | not less than 5 | not less than 5 | 5 |

Production Example 5

In the same manner as in Production Example 1 except that the composition ratio of the resins constituting the intermediate layer B and/or heat sealable layer C, and the thickness of each layer were changed as shown in Table 2, films 6-11 were produced. The constitution and evaluation results of the laminate films are shown in Table 2 and Table 3.

Film 6 was inferior in the product handling property, since the substrate layer was too thin to provide toughness. Moreover, since the substrate layer is thin, the strength of the laminate film itself was low, and the film was inferior in the resistance to breakage of bag. In addition, since the content of the propylene-butene copolymer in the heat sealable layer was small, the film was inferior in the heat sealing energy.

While film 7 and film 8 showed sufficient toughness, they showed low heat sealing energy due to the thin intermediate layer. The package made of the film was markedly poor in the resistance to breakage of the bag.

Laminate film 9 was poor in toughness since the content of the α-olefin copolymer containing a cold xylene-soluble fraction in a proportion of not more than 3% by mass in the intermediate layer was too high, and inferior in the product handling property.

Laminate film 10 is an embodiment where the content of the α-olefin copolymer containing a cold xylene-soluble fraction in a proportion of not more than 3% by mass in the intermediate layer was low, and laminate film 11 is an embodiment free of the α-olefin copolymer containing a cold xylene-soluble fraction in a proportion of not more than 3% by mass in the intermediate layer. These laminate films showed low heat sealing strength and low heat sealing energy, and were inferior in the resistance to breakage of bag.

Production Example 6

In the same manner as in Production Example 2 except that the thickness of each layer constituting the laminate film was changed as shown in Table 3, laminate film 12 was produced. The constitution and evaluation results of the laminate film are shown in Table 3.

While laminate film 12 satisfied the heat sealing strength, it showed a small heat sealing energy since the thickness of the intermediate layer was too small. The package prepared using the laminate film was inferior in the resistance to breakage of bag.

Production Example 7

In the same manner as in Production Example 2 except that the level of corona treatment was adjusted to achieve the wetting tension (after water washing) of the surface of the heat sealable layer C as shown in Table 3, laminate film 13 was obtained.

Due to an excess corona treatment, laminate film 13 showed too high a wetting tension that degraded the sealing performance. While the heat sealing strength was satisfactory, the heat sealing energy was low, and the package made of the laminate film was inferior in the resistance to breakage of bag.

Production Example 8

Using three melt extruders, substrate layer A (propylene homopolymer) was melt-extruded from the first extruder, heat sealable layer C (resin mixture of propylene•ethylene•butene random copolymer-3: 40% by mass and propylene•ethylene•butene random copolymer-2: 60% by mass) was melt-extruded from the second extruder, and intermediate layer B (resin mixture of propylene homopolymer: 40% by mass and propylene•ethylene•butene random copolymer-3: 60% by mass) was melt-extruded from the third extruder, each at a resin temperature of 260° C., and melt-extruded in a T die in the order of substrate layer A/intermediate layer B/heat sealable layer C, which was cool-solidified on a chill roll at 20° C. Then, the obtained unoriented film was stretched 4.5-fold in the longitudinal direction, and 8-fold in the transverse direction to give a laminate film 14 having substrate layer A: 14 μm, intermediate layer B: 14 μm, and heat sealable layer C: 2 μm. The constitution and evaluation results of laminate film 1 are shown in Table 3.

Since intermediate layer B was free of the α-olefin copolymer containing a cold xylene-soluble fraction in a proportion of not more than 3% by mass, and the intermediate layer was thin, laminate film 14 showed low heat sealing energy, and the package made of the laminate film was inferior in the resistance to breakage of bag.

TABLE 2

| laminate film | | 6 | | 7 | | 8 | | 9 | | 10 | |
|---|---|---|---|---|---|---|---|---|---|---|---|
| layer A (substrate layer) | kind | PP-1 | | PP-1 | | PP-1 | | PP-1 | | PP-1 | |
| | mixing ratio | 100 | | 100 | | 100 | | 100 | | 100 | |
| layer B (intermediate layer) | kind | PP-1 | Pr-Et-Bu-1 | PP-1 | Pr-Et-Bu-1 | PP-1 | Pr-Et-Bu-1 | PP-1 | Pr-Et-Bu-1 | PP-1 | Pr-Et-Bu-1 |
| | mixing ratio | 55 | 45 | 55 | 45 | 70 | 30 | 25 | 75 | 95 | 5 |
| layer C (heat | kind | Pr-Et-Bu-1 | Pr-Et-Bu-2 | Pr-Bu-1 | Pr-Bu-1 | | Pr-Et-Bu-2 | | Pr-Et-Bu-1 | Pr-Bu-1 | Pr-Et-Bu-1 | Pr-Bu-1 |

TABLE 2-continued

| laminate film | | 6 | | 7 | | 8 | 9 | | 10 | |
|---|---|---|---|---|---|---|---|---|---|---|
| sealable layer) | mixing ratio | 42.5 | 42.5 | 15 | 100 | 100 | 10 | 90 | 10 | 90 |
| thickness | layer A (μm) | | 3 | | 27 | 32 | | 10 | | 10 |
| | layer B (μm) | | 30 | | 10 | 5 | | 28 | | 28 |
| | layer C (μm) | | 7 | | 3 | 3 | | 2 | | 2 |
| | total | | 40 | | 40 | 40 | | 40 | | 40 |
| heat sealing strength (N/15 mm) | film length direction | | 15.0 | | 14.5 | 10.6 | | 13.1 | | 7.2 |
| | film width direction | | 12.1 | | 11.0 | 8.9 | | 12.8 | | 7.0 |
| heat sealing energy (N · cm/15 mm) | film length direction | | 9.1 | | 9.6 | 8.0 | | 17.1 | | 7.5 |
| | film width direction | | 10.4 | | 9.0 | 8.8 | | 16.2 | | 7.7 |
| toughness: product of tensile modulus of elasticity (GPa)$^2$ | | | 2.1 | | 4.7 | 4.6 | | 2.9 | | 5.1 |
| wetting tension after water washing of surface of heat sealable layer | | | less than 30 | | less than 30 | less than 30 | | less than 30 | | less than 30 |
| antifog property | | | grade 1 | | grade 1 | grade 1 | | grade 1 | | grade 1 |
| product handling property | | | 3 | | 5 | 5 | | 2 | | 5 |
| resistance to breakage of bag (number of drops up to bag breakage) during product handling | | | 4 | | 3 | 1 | | not less than 5 | | 1 |

TABLE 3

| laminate film | | 11 | | 12 | | 13 | | 14 | |
|---|---|---|---|---|---|---|---|---|---|
| layer A (substrate layer) | kind | PP-1 | | PP-1 | | PP-1 | | PP-1 | |
| | mixing ratio | 100 | | 100 | | 100 | | 100 | |
| layer B (intermediate layer) | kind | PP-1 | | PP-1 | Pr-Et-Bu-1 | PP-1 | Pr-Et-Bu-1 | PP-2 | Pr-Et-Bu-3 |
| | mixing ratio | 100 | | 60 | 40 | 60 | 40 | 40 | 60 |
| layer C (heat sealable layer) | kind | Pr-Et-Bu-1 | Pr-Bu-1 | Pr-Et-Bu-1 | Pr-Bu-1 | Pr-Et-Bu-1 | Pr-Bu-1 | Pr-Et-Bu | Pr-Bu-2 |
| | mixing ratio | 40 | 60 | 10 | 90 | 10 | 90 | 40 | 60 |
| thickness | layer A (μm) | 10 | | 30 | | 10 | | 14 | |
| | layer B (μm) | 28 | | 8 | | 28 | | 14 | |
| | layer C (μm) | 2 | | 2 | | 2 | | 2 | |
| | total | 40 | | 40 | | 40 | | 30 | |
| heat sealing strength (N/15 mm) | film length direction | 5.2 | | 13.4 | | 8.1 | | 9.0 | |
| | film width direction | 4.5 | | 11.0 | | 8.7 | | 10.6 | |
| heat sealing energy (N · cm/15 mm) | film length direction | 4.5 | | 9.6 | | 8.8 | | 8.6 | |
| | film width direction | 4.6 | | 9.0 | | 9.8 | | 8.1 | |
| toughness: product of tensile modulus of elasticity (GPa)$^2$ | | 6.1 | | 4.5 | | 3.8 | | 4.8 | |
| wetting tension after water washing of surface of heat sealable layer | | less than 30 | | 34 | | 42 | | less than 30 | |
| antifog property | | grade 1 | | grade 6 | | grade 6 | | grade 1 | |
| product handling property | | 5 | | 5 | | 5 | | 5 | |

TABLE 3-continued

| laminate film | 11 | 12 | 13 | 14 |
|---|---|---|---|---|
| resistance to breakage of bag (number of drops up to bag breakage) during product handling | 1 | 3 | 3 | 2 |

The heat sealable polypropylene resin laminate film of the present invention has sufficient heat sealing strength for packaging heavy goods, is superior in handling property and shows good transparency. Thus, the film is preferable as a packaging material for cereals such as wheat, rice, wheat and the like; root vegetables such as potato, radish-carrot and the like; plate or string konjac, pickled radish; various pickles such as vegetables pickled in soy sauce or sake lees and the like; various bean pastes; jacket materials (e.g., concentrated soup, soup for Japanese noodle, soy sauce, sauce, ketchup, mayonnaise and the like); and collective package for packing several packages of Chinese noodle and the like. Particularly, the film can be used as a packaging material most suitable for packaging cut vegetables for commercial use and the like, that require antifog property.

Moreover, the laminate film of the present invention can also be used as a package of paper carton, tube, bag, cup, standing pack, tray and the like.

The invention claimed is:

1. A heat sealable polypropylene resin laminate film having three or more layers,
   the laminate film comprising:
   a heat sealable layer having a melting point of not more than 150° C. as a surface layer, the heat sealable layer being a random copolymer or a block copolymer obtained by polymerization of two or more monomers selected from the group consisting of α-olefin monomers having a carbon number of 2 to 10;
   a substrate layer made of a crystalline polypropylene resin, and having a melting point higher than the melting point of the heat sealable layer; and
   an intermediate layer disposed between the heat sealable layer and the substrate layer and comprising an α-olefin copolymer containing a cold xylene-soluble fraction in a proportion of not more than 3% by mass and a polypropylene homopolymer,
   wherein the product of the tensile modulus of elasticity in the machine direction (MD) of the film and in the direction (TD) transverse to the machine direction of the film is 3.1-6.0 $(GPa)^2$, and the heat sealing energy in each of the machine direction of the film and the direction transverse to the machine direction of the film is not less than 11N·cm/15 mm when the film is sealed so that a portion of the sealable layer adheres to another portion of the sealable layer, such that the heat sealing strength of the film is not less than 8N/15 mm,
   said crystalline polypropylene resin is a polypropylene homopolymer,
   said α-olefin copolymer is contained in the intermediate layer in a proportion of 10-70% by weight, and
   the thicknesses of the substrate layer and the intermediate layer satisfy the following relational formula:

$2x<y$ wherein x is the thickness of said substrate layer and y is the thickness of the intermediate layer.

2. The laminate film of claim 1, wherein said intermediate layer comprises a crystalline polypropylene resin constituting the substrate layer and a resin constituting the heat sealable layer.

3. The laminate film of claim 1, wherein the surface of said heat sealable layer has a wetting tension after water washing of not less than 31 mN/m and contains an antifog agent before the water washing.

4. The laminate film of claim 1, wherein said laminate film is biaxially oriented.

5. A package comprising the laminate film of claim 1.

6. The laminate film of claim 1, wherein the surface of said heat sealable layer has a wetting tension after water washing of not less than 31 mN/m and contains an antifog agent before the water washing.

7. The laminate film of claim 1, wherein said laminate film is biaxially oriented.

8. A package comprising the laminate film of claim 1.

9. The laminate film of claim 1, wherein the crystalline polypropylene resin comprises isotactic polypropylene.

* * * * *

UNITED STATES PATENT AND TRADEMARK OFFICE
CERTIFICATE OF CORRECTION

| | |
|---|---|
| PATENT NO. | : 9,085,124 B2 |
| APPLICATION NO. | : 10/594057 |
| DATED | : July 21, 2015 |
| INVENTOR(S) | : Kenji Kawai et al. |

It is certified that error appears in the above-identified patent and that said Letters Patent is hereby corrected as shown below:

In the Specification

In column 13, line number 4, insert --random-- after the word butene.

Signed and Sealed this
Sixteenth Day of February, 2016

Michelle K. Lee
*Director of the United States Patent and Trademark Office*